UNITED STATES PATENT OFFICE.

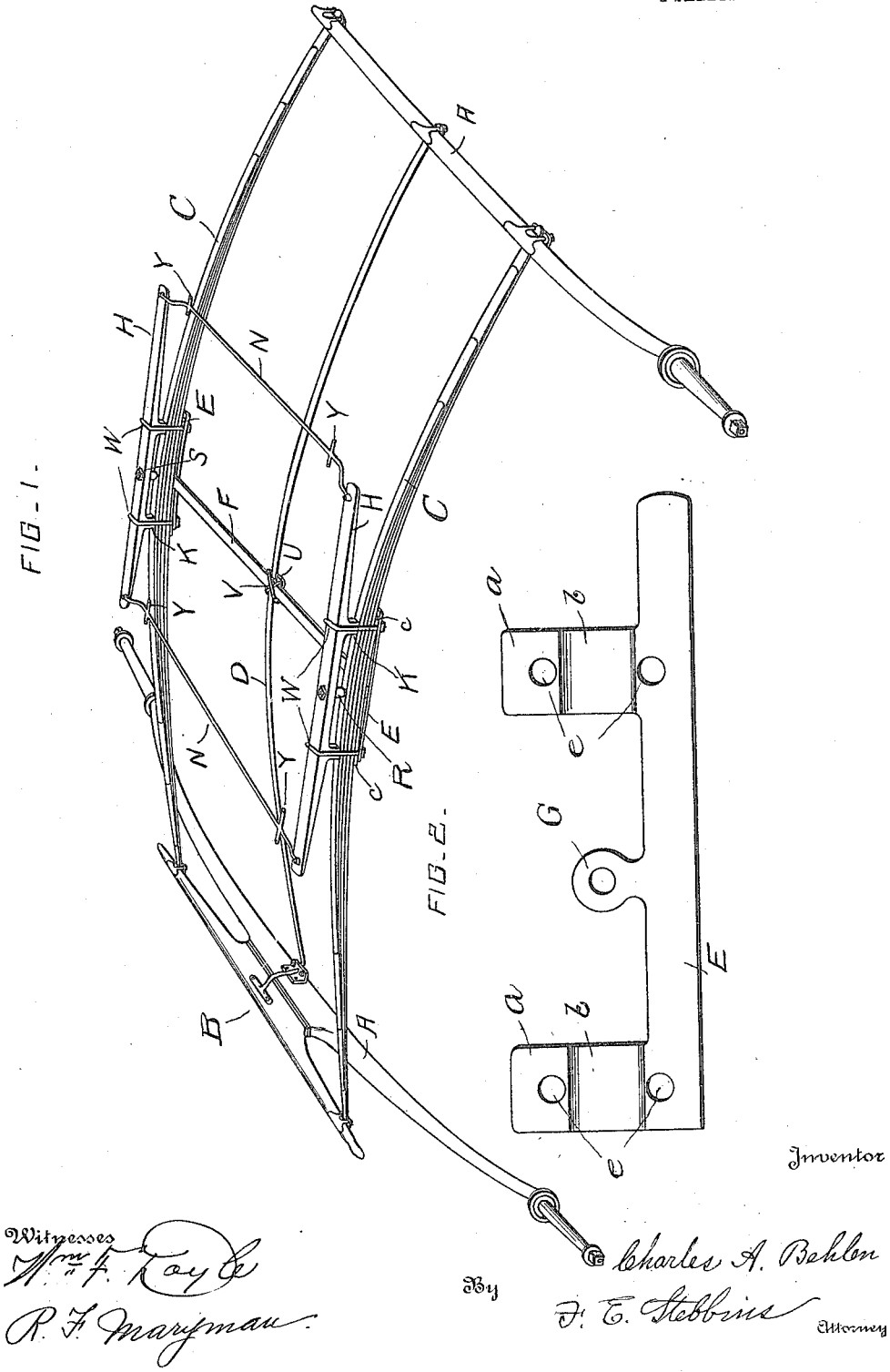

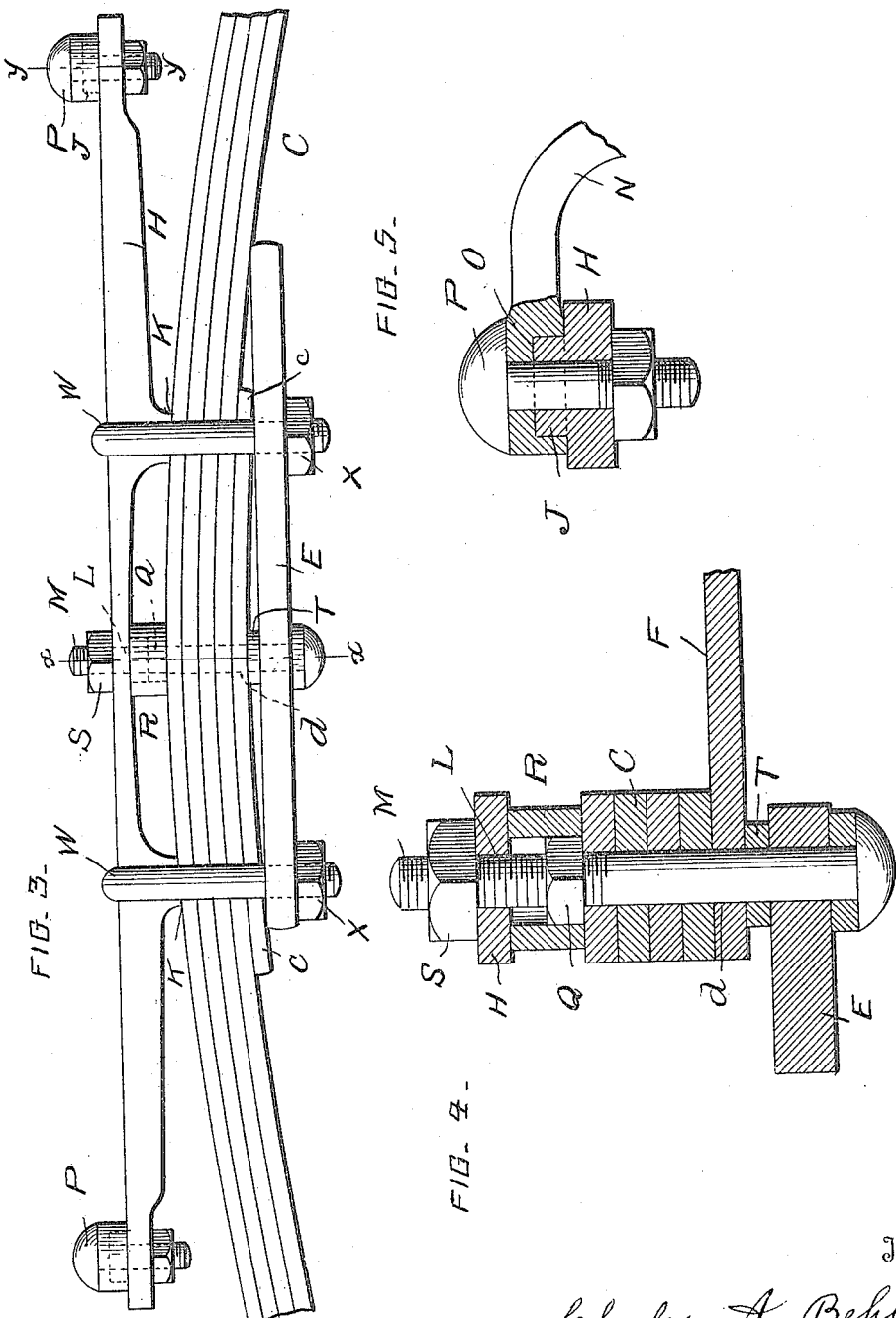

CHARLES A. BEHLEN, OF RICHMOND, VIRGINIA.

MEANS FOR SUPPORTING VEHICLE-BODIES.

1,123,661.  Specification of Letters Patent.  Patented Jan. 5, 1915.

Application filed December 2, 1913. Serial No. 804,174.

*To all whom it may concern:*

Be it known that I, CHARLES A. BEHLEN, a citizen of the United States, residing at Richmond, in the county of Henrico and State of Virginia, have invented certain new and useful Improvements in Means for Supporting Vehicle-Bodies, of which the following is a specification.

The object of my invention is the provision of improved means for supporting vehicle bodies upon side springs, which means shall be comprised of few parts, be simple in construction, easily assembled, light in weight and durable, which shall maintain its square position under all conditions of service, provide a wide body bearing, and utilize the extreme flexibility of the springs, thus attaining ease in riding.

The invention consists in certain novelties of construction and combinations of parts as herein set forth and claimed.

The accompanying drawings illustrate an example of the embodiment of the invention constructed according to the best mode of procedure I have so far devised for the purpose.

Figure 1 is a perspective view of part of the axles, head block, side springs, center spring, and the improved means for supporting the body upon the side springs. Fig. 2 is a top plan view of one rub iron. Fig. 3 is an enlarged view in elevation of part of one side spring, one rub iron, the end of the cross brace, the spring bar, and the means for uniting the several parts. Fig. 4 is a section on line $x$—$x$, Fig. 3. Fig. 5 is a section on line $y$—$y$, Fig. 3.

Referring to the figures, A designates the axles; B, the head block; C, the side springs secured at their ends to the head block and the rear axle by clips; D, the center spring secured at its ends to the axles; E, the two rub irons each with two arms $a$ $a$ having recesses $b$ $b$ for receiving the arms $c$ $c$ of the I-shaped cross brace F preferably made in one piece and perforated at each end at $d$, as indicated, $e$ $e$ being holes in the arms and body of the rub iron; G, a perforated lug extended from the side of the rub iron; H, the spring bars having perforated bosses J at the ends; bearings K K engaging the top surface of a spring and a central perforation L for a threaded bolt M passed through the lug of the rub iron, the cross brace, the spring, and the spring bar, and N N the body loops each having sockets O at the ends fitting the bosses J and perforated, thus interlocking therewith and relieving the bolts P of cross strains. The bolt M is threaded to receive a nut Q above the spring, a spacing tube R surrounding the nut and another nut S applied to the end of the bolt above the spring bar, all as shown. A spacing washer T may be inserted between the lug G and the cross brace, as indicated. The center of spring D is connected to the cross brace by a perforated yoke U and two clips V V, the clips crossing each other and holding the parts together, thus obviating the use of holes in the cross brace and spring, thereby preventing the breaking of either, which in the common construction frequently occurs. Clips W W are extended around the spring bar, spring, and the arms $c$ $c$ of the cross brace, and their threaded ends passed through holes $e$ $e$ in the rub iron and secured by nuts X X, as clearly shown. The body loops are provided with perforated extensions Y Y to receive bolts for the attachment of the body.

From the foregoing description taken with the drawings it is clear that I have provided very simple and efficient means for supporting a body upon the side springs, the cross brace and body loops holding the springs parallel and the spring bars preventing any distortion of the same. Moreover, the flexibility of the springs is not impaired and they are relieved of severe strains at the centers where the holes are located to receive the bolts.

What I claim is:

1. The combination of the side springs, the perforated rub irons having arms $a$ $a$ and a perforated lug G, the cross brace perforated at the ends, the spring bars, bolts passed through each end of a brace the lug G a spring and a spring bar, and clips surrounding each spring bar and spring and their ends passed through the perforations in a rub iron.

2. The combination of the side springs, the perforated rub irons having arms $a$ $a$ and a perforated lug G, the cross brace having arms $c$ $c$ and perforated at the ends, the spring bars, bolts passed through each end of a brace the lug G a spring and a spring bar, and clips surrounding each spring bar spring and arms $c$ $c$ and their ends passed through the perforations in a rub iron.

3. The combination with the cross brace having two arms $c$ $c$ at each end, of a perforated rub iron having arms and a perforated lug G a spring, a spring bar, a bolt passed through the lug G cross brace spring and spring bar, and clips surrounding the spring bar spring arms *c c* and the ends of the clips secured within the perforations in the rub iron; body loops being secured to the ends of the spring bars for supporting a body.

4. The combination of a perforated rub iron having arms and a perforated lug G, the perforated end of a cross brace, a perforated spring, a perforated spring bar, a bolt passed through said perforated elements, a nut above the spring, a nut above the spring bar, and clips uniting the spring bar spring and rub iron.

5. The combination of a perforated rub iron having arms and a perforated lug G, the perforated end of a cross brace, a perforated spring, a perforated spring bar, a bolt passed through said perforated elements, a nut above the spring with a spacing tube around it, a nut above the spring bar, and clips uniting the spring bar spring and rub iron.

6. The combination of a perforated spring, a perforated spring bar bearing upon the spring at two points, a perforated rub iron, a threaded bolt passed through the perforations in the spring bar spring and rub iron, a nut on the threaded bolt clamping together the spring and rub iron, another nut clamping the spring bar to the spring, and clips in line with the bearing points of the spring bar upon the spring and each side of the said bolt uniting the spring bar spring and rub iron.

In testimony whereof I affix my signature in presence of two witnesses.

CHARLES A. BEHLEN.

Witnesses:
RUBIE BRAUER,
BROCKENBROUGH LAMB.

Copies of this patent may be obtained for five cents each, by addressing the "Commissioner of Patents, Washington, D. C."